(12) United States Patent  
Pan et al.

(10) Patent No.: US 8,000,398 B2
(45) Date of Patent: Aug. 16, 2011

(54) TIME DIVISION SYNCHRONOUS ORTHOGONAL FREQUENCY DIVISION MULTIPLEXING SUPPORTING FREQUENCY DIVISION MULTIPLE ACCESS

(75) Inventors: Zhengang Pan, Hong Kong (HK); Wing Chau Chan, Kwai Chung (HK); XueYuan Zhao, Shatin (HK); Chi Ming Lo, Tsuen Wan (HK)

(73) Assignee: Hong Kong Applied Science and Technology Research Institute Company Limited, New Territories (HK)

( * ) Notice: Subject to any disclaimer, the term of this patent is extended or adjusted under 35 U.S.C. 154(b) by 648 days.

(21) Appl. No.: 12/128,430

(22) Filed: May 28, 2008

(65) Prior Publication Data

US 2009/0296834 A1 Dec. 3, 2009

(51) Int. Cl.
*H04K 1/10* (2006.01)
(52) U.S. Cl. ......... 375/260; 375/350; 375/242; 370/210
(58) Field of Classification Search .................. 375/260, 375/350, 240; 370/210
See application file for complete search history.

(56) References Cited

U.S. PATENT DOCUMENTS

| | | | | |
|---|---|---|---|---|
| 7,792,203 | B2 * | 9/2010 | Liu ............................... | 375/260 |
| 2008/0225694 | A1 * | 9/2008 | Yang et al. .................... | 370/210 |
| 2008/0247473 | A1 * | 10/2008 | Yang ............................. | 375/260 |
| 2009/0010345 | A1 * | 1/2009 | Yang et al. .................... | 375/260 |

FOREIGN PATENT DOCUMENTS

| | | |
|---|---|---|
| CN | 1791084 | 6/2006 |
| CN | 1893337 | 1/2007 |
| KR | 4105519 | 12/2004 |

OTHER PUBLICATIONS

Wang et al; Iterative Padding Subtraction of the PN Sequence for the TDS-OFDM over Broadcast Channels; Nov. 2005; IEEE; vol. 51; p. 1148-1152.*

* cited by examiner

*Primary Examiner* — Eva Puente
(74) *Attorney, Agent, or Firm* — Ella Cheong Hong Kong; Margaret Burke; Sam T. Yip

(57) ABSTRACT

A method of time domain synchronous orthogonal frequency division multiplexing (TDS-OFDM) communication, including the steps of: preparing OFDM-body; generating pseudo random (PN) sequence as a training signal; manipulating the PN sequence to concentrate the energy distribution thereof to the same bandwidth of sub-carriers of the OFDM-body; offsetting the manipulated PN sequence to align with frequency spectrum of the sub-carriers; and inserting the offset PN sequence as prefix of a TDS-OFDM data frame. The manipulating step may include the step of repeating the PN sequence by N times, wherein the spectrum of the repeated PN sequence concentrates on discrete bundles of sub-carriers, i.e., on one sub-carrier every N sub-carriers or M adjacent sub-carriers every MN sub-carriers, where M is an integer determined by the time duration ratio of the OFDM body and prefix. Alternatively, the manipulating step may include the step of expanding the PN sequence by N times, wherein the spectrum of the expanded PN sequence concentrates on a block of continual adjacent sub-carriers, the bandwidth of the PN sequence is 1/N of the whole bandwidth.

11 Claims, 9 Drawing Sheets

TIME DIVISION SYNCHRONOUS ORTHOGONAL FREQUENCY DIVISION MULTIPLEXING SUPPORTING FREQUENCY DIVISION MULTIPLE ACCESS

CROSS-REFERENCES TO RELATED APPLICATIONS

This application does not have any related US patent applications at the time of filing.

TECHNICAL FIELD

The presently claimed invention relates generally to methods and apparatus for digital multi-carrier modulation and, in particular, to methods and apparatus for Time Division Synchronous Orthogonal Frequency Division Multiplexing (TDS-OFDM).

BACKGROUND OF THE INVENTION

Orthogonal Frequency Division Multiplexing (OFDM) is one widely utilized multi-carrier based scheme for wired or wireless wideband digital communication systems. One known implementation of OFDM is by the scheme of Cyclic Prefix OFDM (CP-OFDM) in which tail part of OFDM body is used to stuff the guard interval between two consecutive OFDM bodies. Since this CP (cyclic prefix) is actually part of OFDM body, both the CP and the OFDM-body are multi-carrier based. The frequency spectrums of CP and OFDM-body coincide with each other. In practice, this CP can be used to combat inter-symbol-interference (ISI) introduced by multi-path propagation of microwave and, sometimes, to assist timing/frequency synchronization. Additionally, dedicated pilot signals can/should be allocated on certain sub-carriers in this scheme for channel estimation to facilitate the coherent detection/demodulation as well as to assist timing/frequency/sampling synchronization too. Nevertheless, the foregoing advantages are also associated with tradeoff of spectrum efficiency because certain bandwidth is consumed by pilot signals which do not carry any user information.

One other known implementation of OFDM is by the scheme of Time Division Synchronous OFDM (TDS-OFDM) in which a single-carrier modulation based pseudo noise (PN) sequence, instead of tail part of the OFDM body, is stuffed in the guard interval. The pseudo noise (PN) prefix is single-carrier based while OFDM-body is multi-carrier based. Since the PN sequence enables timing/frequency/sampling synchronization as well as channel estimation, there is no dedicated pilot sub-carriers are needed for TDS-OFDM such that the spectrum efficiency is higher than CP-OFDM. The capability of TDS-OFDM has been well proven in broadcast environment, and TDS-OFDM is chosen as the key technology of Chinese Digital Terrestrial TV standard (DMB-T).

The application of TDS-OFDM beyond broadcasting is still under development. One of the challenges is to handle Frequency Division Multiple Access (FDMA), which is a common scheme in modern communication systems to allow two or more than two entities to share the sub-carriers of one OFDM symbol. The PN sequences from respective entities may interfere with each other.

Examples of OFDM applications in communication system include uplink Orthogonal Frequency Division Multiple Access (OFDMA), in which OFDM symbols are generated by different users that occupy different sub-carriers. OFDM can be applied to cellular system, different base stations can serve users on different sub-carriers to achieve frequency reuse factor larger than 1. OFDM also works well in multiple antennas system, in which different antennas may use different orthogonal sub-carriers to transmit pilot signals. While it is straightforward for CP-OFDM to implement multiple access schemes, however it is not implemented as well as for TDS-OFDM.

Chinese patent publication no. CN1893337 discloses an "Emission diversity method for time-domain orthogonal frequency dividing duplexing system" which uses orthogonal PN codes as the PN sequences of TDS-OFDM for different entities. As such, there is no interference between the entities even the PN sequences share the same frequency spectrum. This scheme was proposed to be used with continuous (adjacent) data sub-carrier allocation as well as discrete data sub-carrier allocation. However, the PN sequence is designed to be transmitted over all the sub-carriers. Power is wasted in the part of the spectrum that is not used to transmit the OFDM body of the corresponding entity.

Consequently, a need exists for improved methods and apparatus that can implement FDMA on OFDM and provide full utilization of the transmission spectrum and power.

SUMMARY OF THE INVENTION

It is a primary object of this invention to overcome the shortcoming of known existing Orthogonal Frequency Division Multiplexing (OFDM) system and implement Frequency Division Multiple Access (FDMA) on OFDM to avoid wasting transmission power in transmitting sub-carriers that do not carry OFDM-body and thereby achieve high spectral efficiency.

When two or more entities need to share the sub-carriers of one OFDM symbol in communication systems, FDMA can be used. For FDMA with CP-OFDM, there is no interference between different entities, because the prefix of CP-OFDM is a copy of the OFDM-body. The prefix is actually modulated by the same sub-carrier as the OFDM-body, and therefore the prefix and OFDM-body occupy the same transmission spectrum inherently.

For FDMA with TDS-OFDM, two schemes can be used to allocate the sub-carriers for modulating the data: continuous sub-carrier allocation and discrete sub-carrier allocation. However, interference occurs between the transmissions of PN sequences from different entities because they occupy the same spectrum. This can be solved by using different orthogonal PN sequence for different entities. Nevertheless, there is a waste of transmitting power on the sub-carriers that do not belong to corresponding entities.

As regards continuous sub-carrier allocation, the bodies are transmitted on a block of sub-carriers, where each block is composed of a set of continual adjacent sub-carriers. However, each transmission still has to cover the whole bandwidth because the PN sequence covers the whole bandwidth. Transmission power is therefore wasted in each entity for transmitting sub-carriers that never carry OFDM-body.

As regards discrete sub-carrier allocation, the body is transmitted on a group of sub-carriers, where each group is composed of a set of discrete bundles of sub-carriers, for example, sub-carriers selected in a way as one sub-carrier every N sub-carriers or M adjacent sub-carriers (one bundle) every MN sub-carriers. However, the whole bandwidth is also used to transmit the PN sequence, whereas OFDM-body is carried by a portion of sub-carriers in that bandwidth. Similarly, transmission power is wasted in transmitting sub-carriers that do not carry the OFDM-body.

Transmission methods for OFDM are hereby disclosed to concentrate the energy of the prefix spectrum and offset the same to become coincide with the sub-carrier spectrum of the same entity. As a result of the claimed transmission methods, high power efficiency and high spectral efficiency for TDS-OFDM is attained.

According to a first aspect of the claimed invention, there is provided a method of time domain synchronous orthogonal frequency division multiplexing (TDS-OFDM) communication, including the steps of: preparing OFDM-body; generating pseudo random (PN) sequence as a training signal; manipulating the PN sequence to concentrate the energy distribution thereof to the same bandwidth of sub-carriers of the OFDM-body; offsetting the manipulated PN sequence to align with frequency spectrum of the sub-carriers; and inserting the offset PN sequence as prefix of a TDS-OFDM data symbol.

The manipulating step may include the step of repeating the PN sequence by N times, wherein the spectrum of the repeated PN sequence will only concentrate on discrete bundles of sub-carriers, i.e., on one sub-carrier every N sub-carriers or M adjacent sub-carriers every MN sub-carriers. Where M is an integer determined by the time duration ratio of the OFDM body and prefix.

Alternatively, the manipulating step may include the step of expanding the PN sequence by N times, wherein the spectrum of the expanded PN sequence will only concentrate on a block of continual adjacent sub-carriers whose bandwidth is 1/N of the whole bandwidth.

Advantageously, the preparing OFDM-body step may further include the steps of receiving a baseband data stream; demultiplexing the baseband data stream to a plurality of parallel data streams; allocating each of the parallel data streams to a respective sub-carrier frequency, wherein each parallel data stream is modulated with one of a plurality of orthogonal sub-carriers into a corresponding symbol stream; performing inverse Fourier transform to transform the symbol streams into time domain representation of the symbol streams; and padding the time domain representation of symbol streams into the TDS-OFDM data symbol.

According to a second aspect of the claimed invention, there is provided a transmitter for time domain synchronous orthogonal frequency division multiplexing (TDS-OFDM), including: composing unit for preparing OFDM-body; PN generator for generating pseudo random (PN) sequence as a training signal; manipulating unit for manipulating the PN sequence to concentrate the energy distribution thereof to the same bandwidth of sub-carriers of the OFDM-body; frequency offsetting unit for offsetting the manipulated PN sequence to align with frequency spectrum of the sub-carriers; and padding unit for inserting the offset PN sequence as prefix of a TDS-OFDM data symbol.

The manipulating unit may repeat the PN sequence by N times, wherein the spectrum of the repeated PN sequence will only concentrate on discrete bundles of sub-carriers, i.e., on one sub-carrier every N sub-carriers or M adjacent sub-carriers every MN sub-carriers. Where M is a integer determined by the time duration ratio of the OFDM body and prefix.

The manipulating unit may expand the PN sequence by N times, wherein the spectrum of the expanded PN sequence will only concentrate on a block of continual adjacent sub-carriers whose bandwidth is 1/N of the whole bandwidth.

The composing unit preferably further includes: buffer for receiving a baseband data stream; demultiplexer for demultiplexing the baseband data stream to a plurality of parallel data streams; allocating unit for allocating each of the parallel data streams to a respective sub-carrier frequency, wherein each parallel data stream is modulated with one of a plurality of orthogonal sub-carriers into a corresponding symbol stream; and digital signal processing unit for performing inverse Fourier transform to transform the symbol streams into time domain representation of the symbol streams. The padding unit may further pad the time domain representation of symbol streams into the TDS-OFDM data symbol.

Other aspects of the invention are also disclosed.

BRIEF DESCRIPTION OF THE DRAWINGS

Certain embodiments of the presently claimed invention will be described hereinafter in greater detail with reference to the drawings, in which:

FIG. 1b depicts the frequency spectrum of the TDS-OFDM symbol in FIG. 1a.

DETAILED DESCRIPTION

The presently claimed invention is described in detail herein in accordance with certain preferred embodiments thereof. To describe fully and clearly the details of the invention, certain descriptive names were given to the various components such as controller, digital signal processing unit, demultiplexer and multiplier. It should be understood by those skilled in the art that these descriptive terms were given as a way of easily identifying the components in the description, and do not necessary limit the invention to the particular description.

Figure 1A:
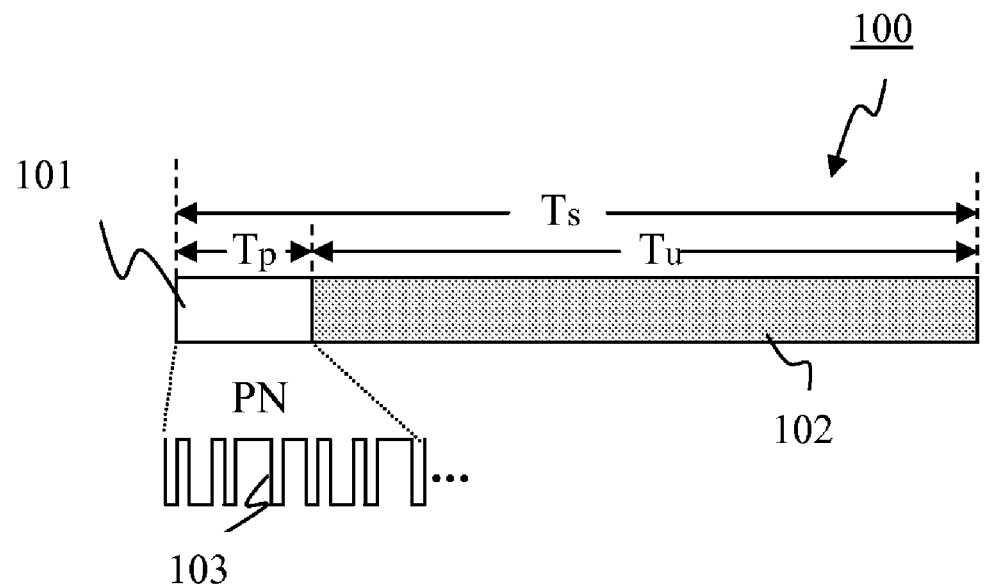
FIG. 1a depicts the time domain symbol structure of a TDS-OFDM symbol.

FIG. 1a depicts the time domain symbol structure of a TDS-OFDM symbol 100. The symbol 100 composes of a prefix 101 (frame sync) and an OFDM-body 102. The prefix 101 further contains a PN sequence 103 for training purpose and has a duration of $T_p$. The OFDM-body 102 carries data stream to be transmitted and has a duration of $T_u$. The overall duration of a TDS-OFDM symbol is $T_s$.

Figure 1B:
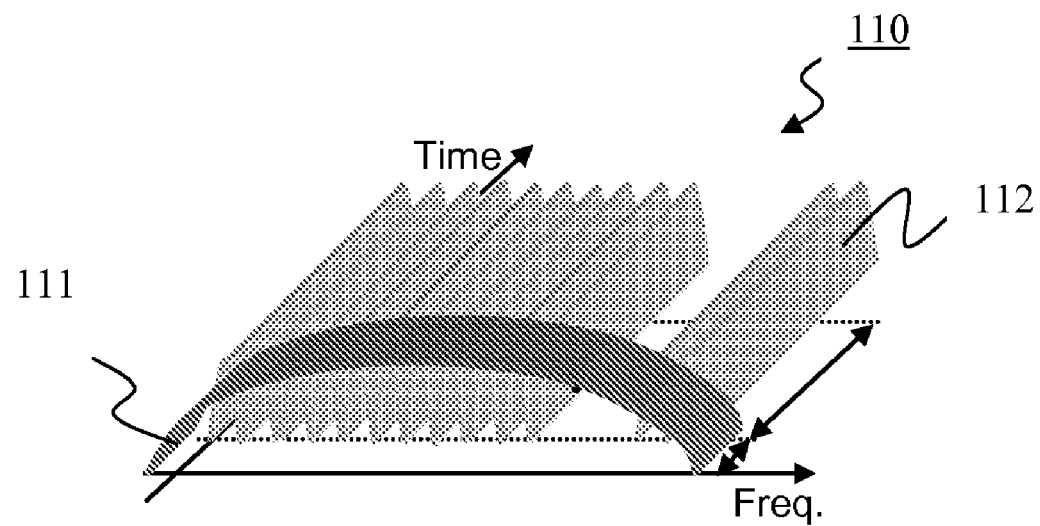

FIG. 1b depicts the frequency spectrum 110 of the TDS-OFDM symbol in FIG. 1a. The prefix is modulated by a single carrier and has a spectrum 111 spanning over the whole transmitting bandwidth. The OFDM-body is modulated by orthogonal sub-carriers each occupying a narrow bandwidth 112 within the transmitting bandwidth.

In general, discrete sub-carrier allocation is used in fast fading cases to achieve frequency diversity, whereas continuous sub-carrier allocation is used in slow fading cases to achieve multi-user diversity. The fading rate is a concept of relativity. The definition could vary in different application scenarios.

In the presently claimed invention, the fading rate is preferably defined as moving speed (with unit m/s) (of the transmitter or receiver or both) divided by wavelength of the carrier (with unit m). For example, if the carrier frequency is 1 GHz, the wavelength is 0.3 m. Then if the moving speed is 3 m/s, the fading rate becomes 10 Hz, where 3 m/s corresponds to 10.8 Km/h.

For illustrating purpose, assuming that the symbol duration of one TDS-OFDM symbol is 5 ms (corresponds to 200 Hz). When the fading rate is less than 20 Hz (less than 1/10), it can be treated as slow fading. When the fading rate is more than 200 Hz (comparable to the symbol duration), it can be treated as fast fading.

Figure 2:
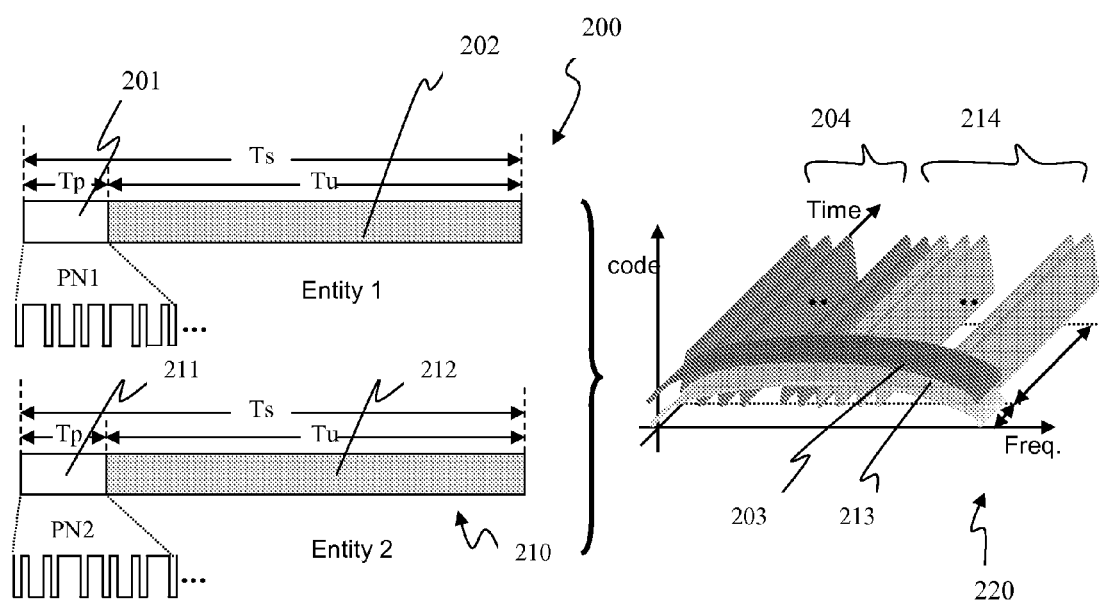
FIG. 2 depicts the time domain symbol structure and frequency spectrum of two TDS-OFDM entities operating FDMA under continuous sub-carrier allocation.

FIGS. 2a and 2b depict the time domain symbol structure 200, 210 and frequency spectrum 220 of two TDS-OFDM entities operating FDMA under continuous sub-carrier allocation. Entity 1 transmits an OFDM symbol 200 consisting of prefix 201 and OFDM-body 202. In the meantime, entity 2 transmits an OFDM symbol 210 consisting of prefix 211 and OFDM-body 212.

The OFDM-body spectrums 204, 214 of entity 1 and entity 2 are designed to respectively span across a continuous bandwidth and do not overlap, whereas the prefix spectrums 203, 213 of entity 1 and entity 2 both occupy the whole transmitting bandwidth and overlap with each other. Interference between prefix transmission of entity 1 and entity 2 can be avoided by using orthogonal PN sequences for different entities.

Figure 3:
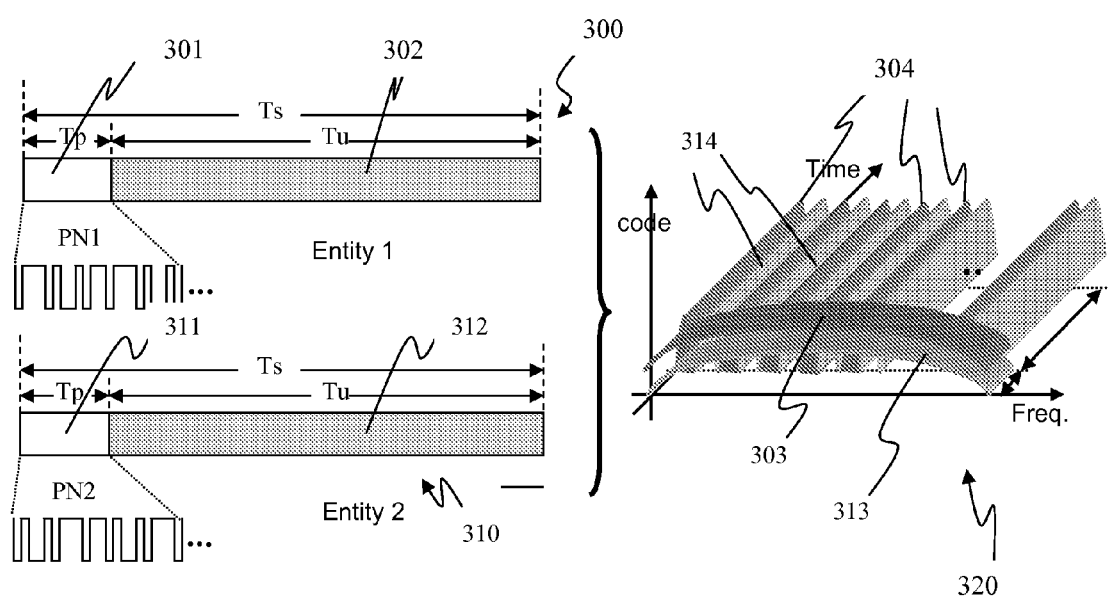
FIG. 3 depicts the time domain symbol structure and frequency spectrum of two TDS-OFDM entities operating FDMA under discrete sub-carrier allocation.

FIGS. 3a and 3b depicts the time domain symbol structure 300, 310 and frequency spectrum 320 of two TDS-OFDM entities operating FDMA under discrete sub-carrier allocation. Entity 1 transmits an OFDM symbol 300 consisting of prefix 301 and OFDM-body 302. In the meantime, entity 2 transmits an OFDM symbol 310 consisting of prefix 311 and OFDM-body 312.

As in continuous sub-carrier allocation, the prefix spectrums 303, 313 of entity 1 and entity 2 in discrete sub-carrier allocation both occupy the whole transmitting bandwidth and overlap with each other. However, the OFDM-body spectrums 304, 314 of entity 1 and entity 2 are designed as frequency groups which interleave with each other. Once again, interference between prefix transmission of entity 1 and entity 2 can be avoided by using orthogonal PN sequences for different entities.

In either scheme of continuous sub-carrier allocation or discrete sub-carrier allocation, transmission power is wasted because the prefix spans over the whole transmitting bandwidth. As a result, some sub-carriers only carry the prefix but do not carry the OFDM-body.

Time Domain Code Repetition Method

Figure 4:
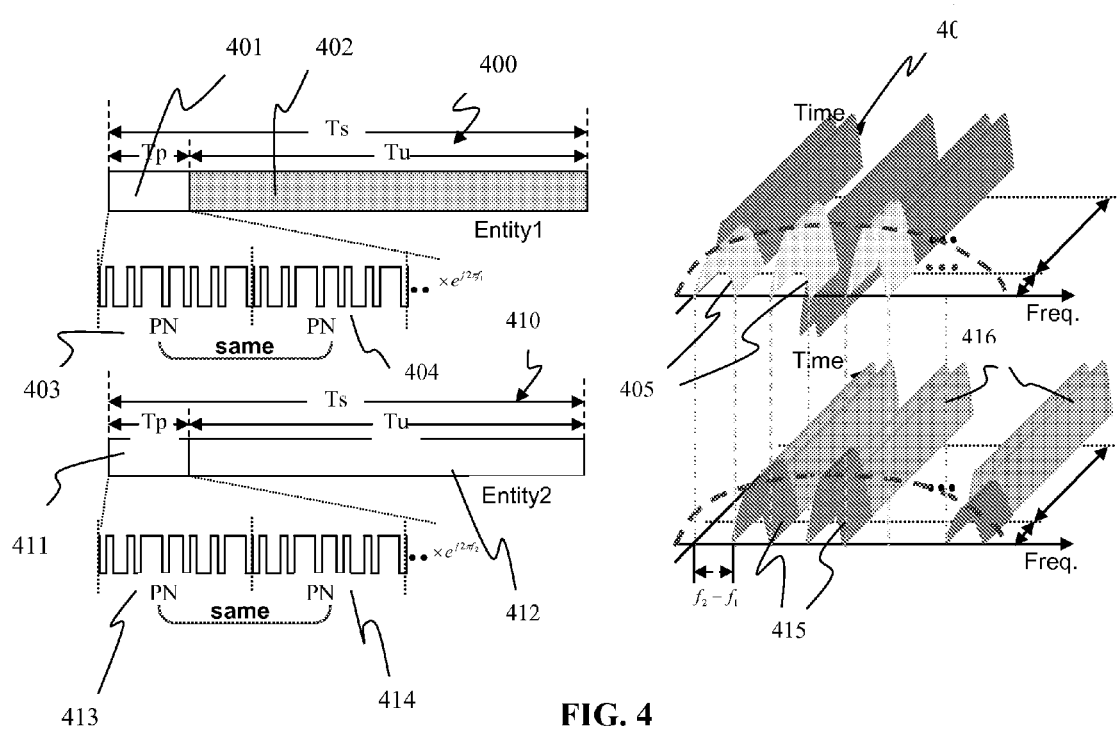
FIG. 4 depicts the time domain symbol structure and frequency spectrum of two TDS-OFDM entities operating FDMA under discrete sub-carrier allocation according to an embodiment of the claimed invention.

FIG. 4 depicts the time domain symbol structure 400, 410 and frequency spectrum of two TDS-OFDM entities operating FDMA under discrete sub-carrier allocation according to an embodiment of the claimed invention.

The most efficient way to perform TDS-OFDM transmission is to reshape the prefix spectrum 405, 415 to be the same as the OFDM-body spectrum 406, 416 such that the sub-carriers transmit both the prefix 401, 411 and OFDM-body 402, 412. According to an embodiment of the claimed invention, the PN sequence 403, 413 in the prefix 401, 411 of the OFDM frame 400, 410 is repeated by N times in the time domain, when time duration of the prefix, $T_p=1/M$ of time duration of the OFDM-body, $T_u$ As a result, the corresponding prefix spectrum 405, 415 concentrates on discrete bundles of sub-carriers in a way as M adjacent sub-carriers (one bundle) every MN sub-carriers. The repeated sequences 403 and 404, 413 and 414 of entity 1 and entity 2 are then respectively multiplied by $e^{j2\pi f1}$ and $e^{j2\pi f2}$ to introduce frequency offset to the individual prefix spectrum, where f1 and f2 are the frequency of the first sub-carrier for entity 1 and entity 2 respectively. In addition, (f2-f1) substantially equals to M times of bandwidth of each sub-carrier. Consequently, the prefix spectrum 405, 415 and the OFDM-body spectrum 406, 416 are aligned for the same entity and do not overlap between different entities.

By using time domain repeated PN sequence as the prefix, and further introducing different frequency offsets to different entities, the energy of the repeated PN sequence will concentrate on several discrete frequency blocks and possess a spectrum similar to the multi-carrier system. Such time domain code repetition method is preferably used with discrete sub-carrier allocation among different entities. It is also advantageous to be used with MIMO schemes where channel estimation over whole bandwidth for each antenna element is needed.

The width of each bundle depends on the relative length of prefix, for example, four times (i.e., M=4) as sub-carrier if the prefix is one-fourth of the OFDM-body. This relationship also directly determines the granularity of sub-carrier allocation and frequency offset of prefix for different entities. To adopt more users in the system, the PN sequence can be repeated by corresponding number of times.

Simple examples are given to illustrate the determination of the values of some parameters in the claimed invention.

Assuming that the system bandwidth is $f_w$=10.24 MHz, and the number of sub-carriers are 1024. Then the bandwidth of each sub-carrier is $$f_{sub}=10.24\text{MHz}/1024=10\text{KHz}$$

The time duration of one OFDM symbol body is $$T_u=1/f_{sub}=100\text{us}$$

By further assuming that the length of prefix is ¼ of the OFDM body, the time duration of one prefix is:

$$T_p=100\text{us}/4=25\text{us}$$

As a result, the time duration of one OFDM symbol is $$T_s=T_u+T_p=125\text{us}$$

Figure 5A:
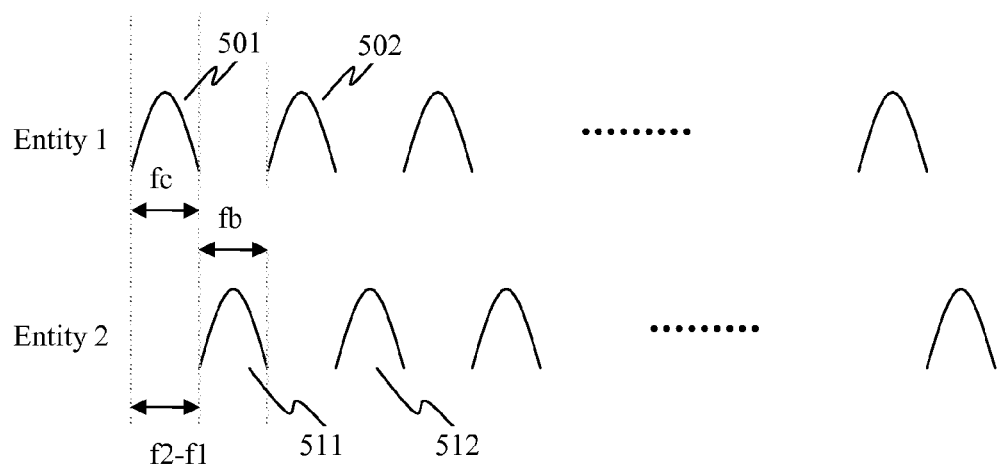
FIG. 5a depicts the frequency spectrum of the prefixes from two TDS-OFDM entities according to the scheme in FIG. 4.

FIG. 5a depicts the frequency spectrum of the prefixes from two TDS-OFDM entities according to the scheme in FIG. 4. Prefix spectra 501, 502 correspond to entity 1 while prefix spectra 511, 512 correspond to entity 2. In the time domain code repetition method, if there are two entities, the PN sequence is repeated twice, i.e.:

$f_c=f_{sub}*4=40$ KHz, where the value of 4 corresponds to the prefix duration being ¼ of the length of the OFDM body.

$$f_b=f_c*2-f_c=40\text{KHz}$$

($f_c+f_b$) should be twice of $f_c$ because the PN sequence is repeated twice.

The frequency offset to maintain the orthogonality between two prefixes is:

$$f_2-f_1=40\text{KHz}$$

Figure 5B:
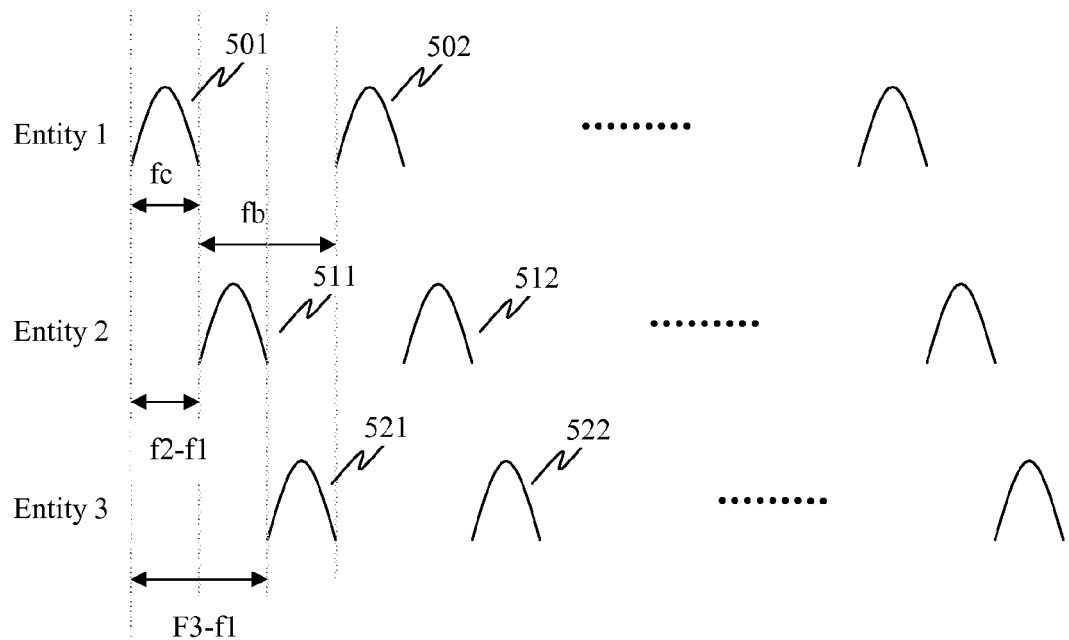
FIG. 5b depicts the frequency spectrum of the prefixes from three TDS-OFDM entities according to the scheme in FIG. 4.

FIG. 5*b* depicts the frequency spectrum of the prefixes from three TDS-OFDM entities according to the scheme in FIG. 4. Prefix spectra 501, 502 correspond to entity 1, prefix spectra 511, 512 correspond to entity 2, and prefix spectra 521, 522 correspond to entity 3. As there are three entities, the PN sequence is repeated by three times, i.e.:

$f_c=f_{sub}*4=40$ KHz, where the value of 4 corresponds to the prefix duration being ¼ of the length of the OFDM body.

$$f_b=f_c*3f=80\text{KHz}$$

($f_c+f_b$) should be three times of $f_c$ because the PN sequence is repeated three times.

The frequency offsets to maintain the orthogonality between three prefixes are:

$$f_2-f_1=40\text{KHz}$$

$$f_3-f_1=80\text{KHz}$$

Expanded PN Sequence

Figure 6:
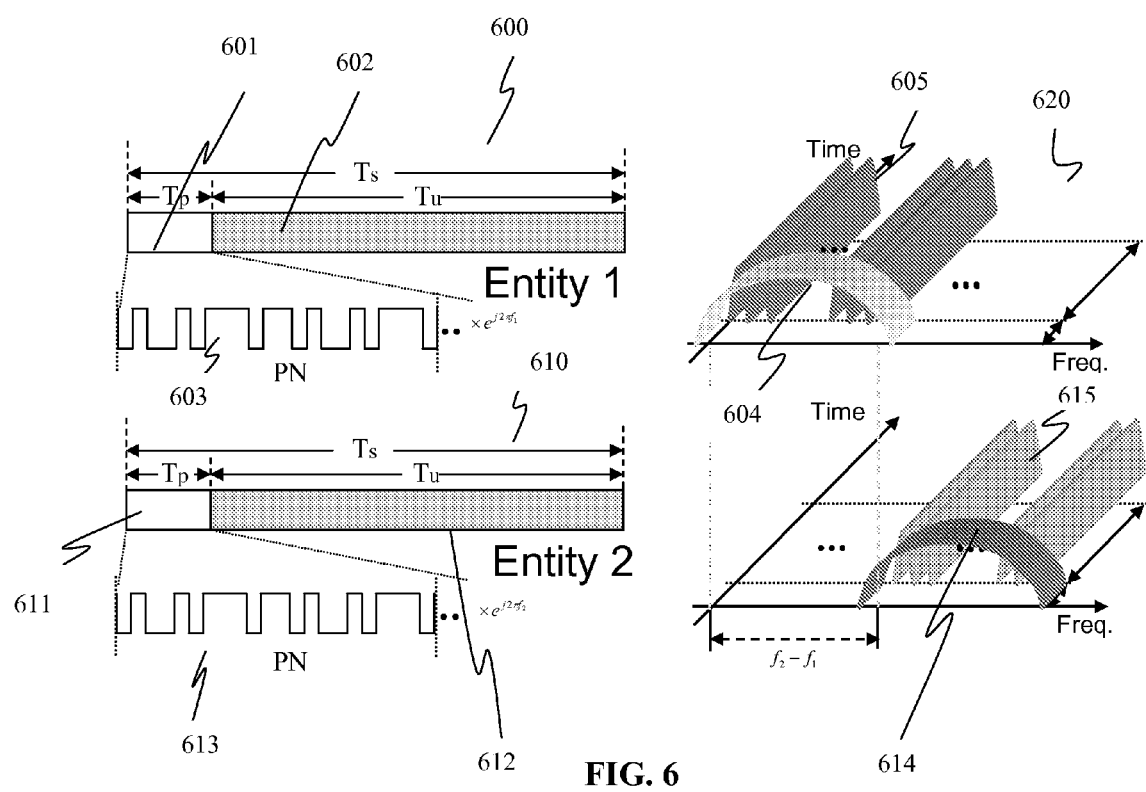
FIG. 6 depicts the time domain symbol structure and frequency spectrum of two TDS-OFDM entities operating FDMA under continuous sub-carrier allocation according to another embodiment of the claimed invention.

FIG. 6 depicts the time domain symbol structure 600, 610 and frequency spectrum 620 of two TDS-OFDM entities operating FDMA under continuous sub-carrier allocation according to another embodiment of the claimed invention.

As in the discrete sub-carrier allocation, the most efficient way to perform TDS-OFDM transmission in continuous sub-carrier is to reshape the prefix spectrum 604, 614 to be the same as the OFDM-body spectrum 605, 615 such that the sub-carriers transmit both the prefix 601, 611 and OFDM-body 602, 612. According to an embodiment of the claimed invention for continuous sub-carrier allocation, the PN sequence 603, 613 in the prefix 601, 603 of the OFDM frame 600, 610 is expanded (stretched) for N times in the prefix of the data packet.

Consequently, the corresponding prefix spectrum 604, 614 shrinks by N times. The expanded sequences 603, 613 of entity 1 and entity 2 are then respectively multiplied by $e^{j2\pi f1}$ and $e^{j2\pi f2}$ to introduce frequency offset to the individual prefix spectrum, where f1 and f2 are the frequency of the first sub-carrier for entity 1 and entity 2 respectively. In addition, (f2-f1) substantially equals to the bandwidth of each prefix spectrum and hence each OFDM-body spectrum. Consequently, the prefix spectrum 604, 614 and the OFDM-body spectrum 605, 615 are aligned for the same entity and do not overlap between different entities.

By using expanded PN sequence as the prefix, and further introducing different frequency offsets to different entities, the energy of the expanded PN sequence will concentrated on one frequency block each composed of adjacent sub-carriers. As the prefix spectrum spans over a partial bandwidth, the method is preferred to be used with adjacent sub-carrier allocation among different entities.

The width of frequency block depends on expansion factor of the PN sequence, for example, ½ of the whole bandwidth if the expansion factor is 2. The granularity of sub-carrier allocation is determined by the relative duration of prefix, for example, four sub-carriers if the prefix is one-fourth of the OFDM-body. To adopt more users in the system, the PN sequence can be expanded by a factor corresponding to the number of users.

Simple examples are given to illustrate the determination of the values of some parameters in the claimed invention.

Assuming that the system bandwidth is $f_w$=10.24 MHz, and the number of sub-carriers are 1024. Then the bandwidth of each sub-carrier is $$f_{sub}=10.24\text{MHz}/1024=10\text{KHz}$$

The time duration of one OFDM symbol body is $$T_u=1/f_{sub}=100\text{us}$$

By further assuming that the length of prefix is ¼ of the OFDM body, the time duration of one prefix is:

$$T_p=100\text{us}/4=25\text{us}$$

As a result, the time duration of one OFDM symbol is $$T_s=T_u+T_p=125\text{us}$$

Figure 7A:
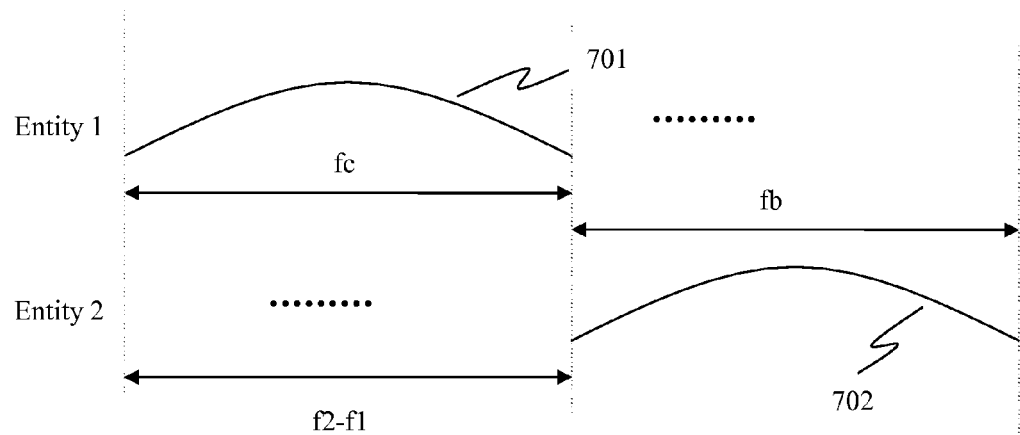
FIG. 7a depicts the frequency spectrum of the prefixes from two TDS-OFDM entities according to the scheme in FIG. 6.

FIG. 7*a* depicts the frequency spectrum of the prefixes from two TDS-OFDM entities according to the scheme in FIG. 6. Prefix spectra 701 correspond to entity 1 while prefix spectra 702 correspond to entity 2. In the expanded PN sequence method, if there are 2 entities, the PN sequence is expanded twice.

$f_c=f_w/2=5.12$ MHz, where the value of 2 corresponds to expansion of PN sequence twice.

$$f_b=f_w-f_c=5.12\text{MHz}$$

($f_c+f_b$) should be equal to the whole transmitting bandwidth.

The frequency offset to maintain the orthogonality between two prefixes is:

$$f_2-f_1=5.12\text{MHz}.$$

Figure 7B:
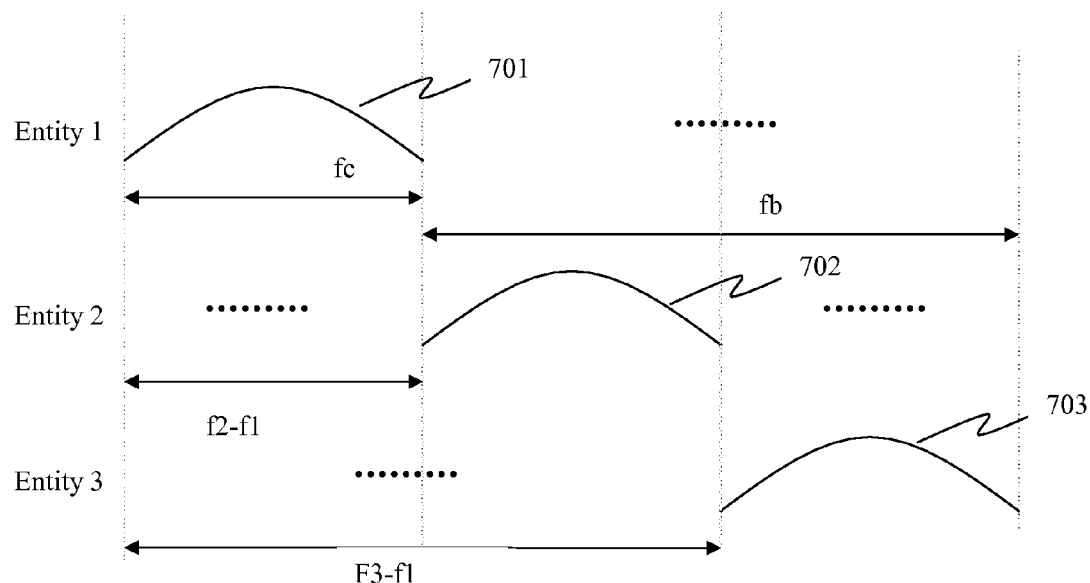
FIG. 7b depicts the frequency spectrum of the prefixes from three TDS-OFDM entities according to the scheme in FIG. 6.

FIG. 7*b* depicts the frequency spectrum of the prefixes from three TDS-OFDM entities according to the scheme in FIG. 6. Prefix spectra 701 correspond to entity 1, prefix spectra 702 correspond to entity 2, and prefix spectra 703 correspond to entity 3. As there are 3 entities, the PN sequence is expanded by three times, i.e.:

$f_c=f_w/3\sim=3.41$ MHz, where the value of 2 corresponds to expansion of PN sequence by three times.

$$f_b=f_w-f_c=6.82\text{MHz}$$

($f_c+f_b$) should be equal to the whole bandwidth.

The frequency offsets to maintain the orthogonality between three prefixes are:

$$f_2-f_1=3.41\text{MHz}$$

$$f_3-f_1=6.82\text{MHz}$$

Figure 8:
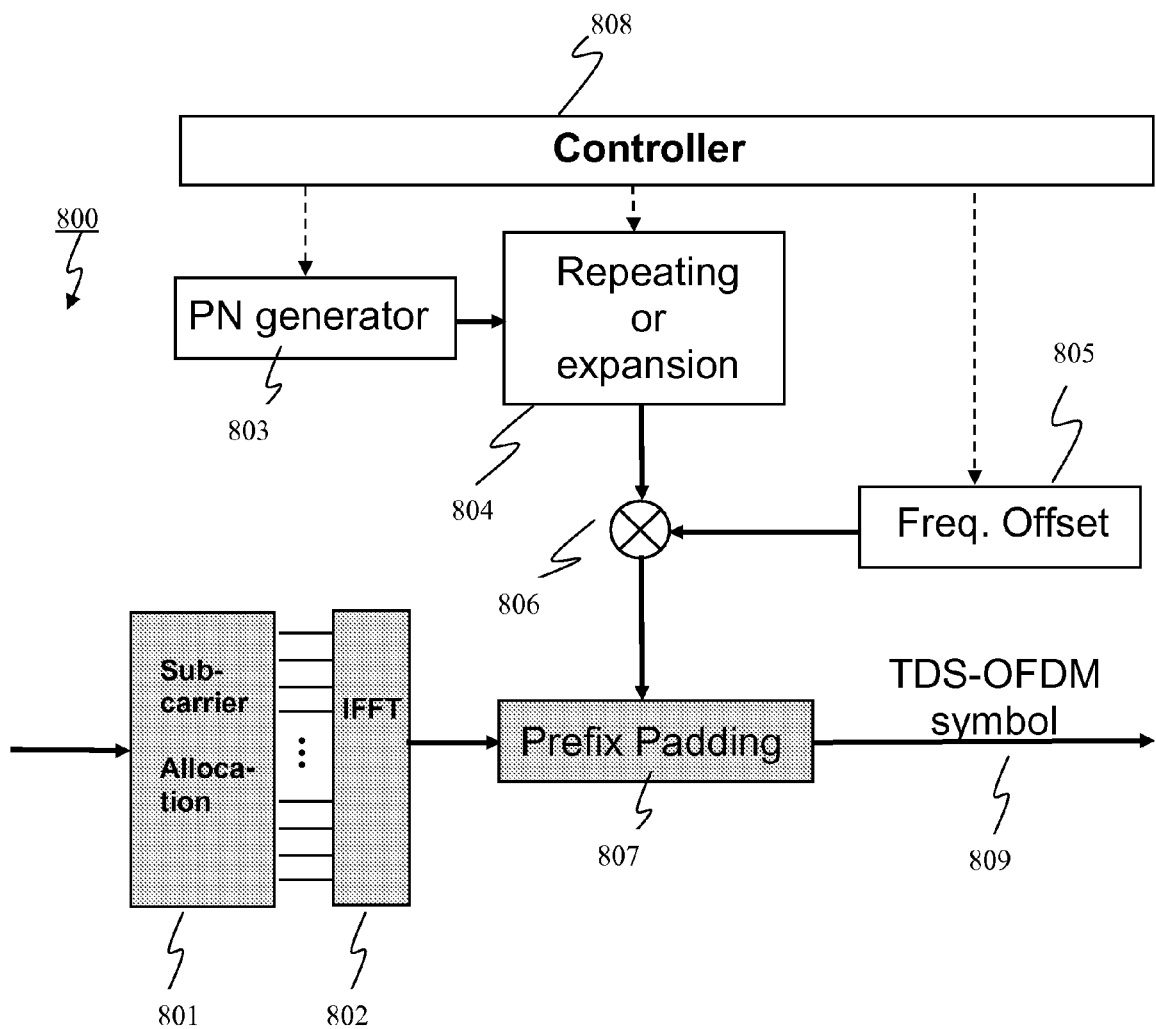
FIG. 8 depicts the block diagram of the TDS-OFDM transmitter according to an embodiment of the presently claimed invention.

FIG. 8 depicts the block diagram of the TDS-OFDM transmitter 800 according to an embodiment of the invention. The OFDM-body is firstly composed. Demultiplexer 801 receives a baseband input data stream and demultiplexes the same into a plurality of parallel data streams. Meanwhile, it allocates each of the parallel data streams to a respective sub-carrier frequency under the discrete sub-carrier allocation scheme or the continuous sub-carrier allocation scheme, while each parallel data stream is modulated with one of a plurality of orthogonal sub-carriers into a corresponding symbol stream. Digital signal processing unit 802 then performs inverse Fast Fourier transform (IFFT) to transform the symbol streams into corresponding time domain representation.

The prefix is subsequently prepared. PN generator 803 generates PN sequence as a training signal for the TDS-OFDM packet. Such PN sequence is further processed by the manipulating unit 804 to concentrate the energy distribution thereof to the same bandwidth of the sub-carriers according to the scheme in FIG. 4 or FIG. 6. For discrete sub-carrier allocation, the manipulating unit 804 repeats the PN sequence by N times wherein the spectrum of the repeated PN sequence will only concentrate on discrete bundles of sub-carriers, i.e., on one sub-carrier every N sub-carriers or M adjacent sub-carriers every MN sub-carriers. Where M is an integer determined by the time duration ratio of the OFDM body and prefix. For continuous sub-carrier allocation, the manipulating unit 804 expands said PN sequence by N times, wherein the spectrum of the expanded PN sequence will only concentrate on a block of continual adjacent sub-carriers whose bandwidth is 1/N of the whole bandwidth. Frequency generator 805 generates the offsetting signal in offset frequency for the corresponding prefix. Controller 808 alternatively sends commands to PN generator 803, manipulating unit 804, and frequency generator 805 for controlling them to perform optimized operations. The multiplier 806 then multiplies the offsetting signal with the manipulated PN sequence to align the PN sequence with the sub-carriers frequency spectrum.

The padding unit 807 finally pads the time domain representation of symbol streams into a TDS-OFDM data symbol and further inserts the offset and manipulated PN sequence as the symbol prefix of the TDS-OFDM data symbol to output the TDS-OFDM symbol 809.

Figure 9:
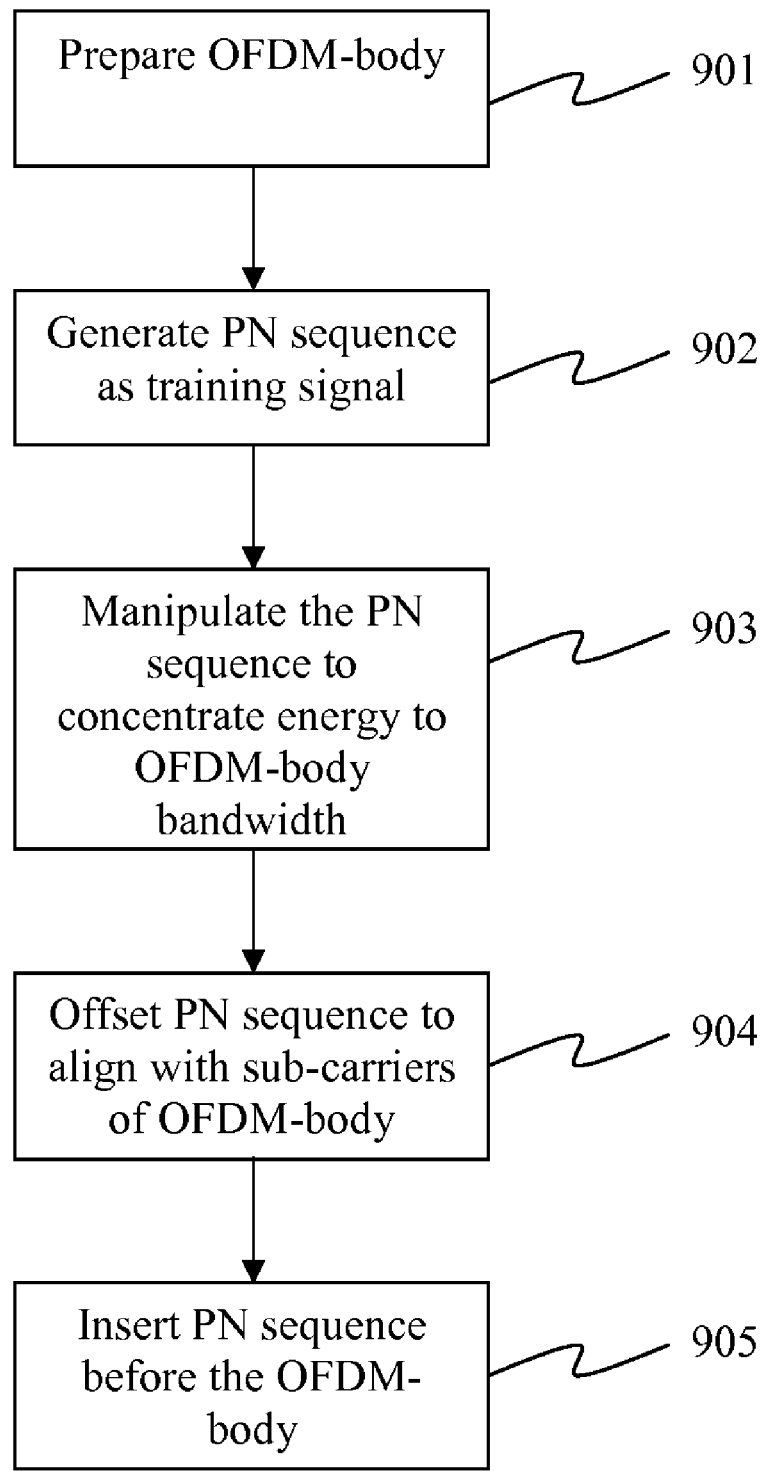
FIG. 9 is a flow chart illustrating the method of TDS-OFDM communication according to an embodiment of the presently claimed invention.

FIG. 9 is a flow chart illustrating the method of TDS-OFDM communication. At step 901, the OFDM-body is prepared. At step 902, a pseudo random (PN) sequence is generated as a training signal. At step 903, the PN sequence is manipulated such that the energy distribution of the PN sequence is concentrated to the same bandwidth of sub-carriers of the OFDM-body. At step 904, the manipulated PN sequence is offset to align with frequency spectrum of the sub-carriers of the OFDM-body. At step 905, the offset PN sequence is inserted before the OFDM-body as symbol prefix of a TDS-OFDM data symbol.

INDUSTRIAL APPLICABILITY

The communication methodologies described are applicable to the communication industries and particularly for communication systems performing digital multi-carrier modulation, including wired communication systems, wireless communication systems, broadcast systems, unicast systems and multicast systems. The arrangements are especially suitable for TDS-OFDM systems operating under FDMA.

The foregoing describes only some embodiment of the presently claimed invention, and modifications and/or changes can be made thereto without departing from the scope and spirit of the invention, the embodiments being illustrative and not restrictive.

The invention claimed is:

1. A method of time domain synchronous orthogonal frequency division multiplexing (TDS-OFDM) communication, comprising the steps of:
    preparing OFDM-body;
    generating pseudo random (PN) sequence as a training signal;
    manipulating said PN sequence to concentrate the energy distribution thereof to the same bandwidth of sub-carriers of said OFDM-body;
    offsetting the manipulated PN sequence to align with frequency spectrum of said sub-carriers; and
    inserting the offset PN sequence as symbol prefix of a TDS-OFDM data symbol.

2. The method of TDS-OFDM communication according to claim 1, wherein said manipulating step further comprises a repeating step that repeats said PN sequence by N times, wherein the spectrum of the repeated PN sequence concentrates on discrete bundles of sub-carriers which are selected as one sub-carrier every N sub-carriers, where N is an integer greater than 1.

3. The method of TDS-OFDM communication according to claim 1, wherein said manipulating step further comprises the step of expanding said PN sequence by N times, wherein the spectrum of the expanded PN sequence concentrates on a block of continual adjacent sub-carriers, the bandwidth of the expanded PN sequence is 1/N of the whole bandwidth, where N is an integer greater than 1.

4. The method of TDS-OFDM communication according to claim 1, wherein said preparing OFDM-body step further comprises:
    receiving one or more baseband data stream;
    demultiplexing said baseband data stream to a plurality of parallel data streams;
    allocating each data stream of said plurality of parallel data streams to a respective sub-carrier frequency, wherein each said data stream is modulated with one of a plurality of orthogonal sub-carriers into a corresponding symbol stream;
    performing inverse Fourier transform to transform the symbol streams into time domain representation of said symbol streams; and
    padding the time domain representation of symbol streams into said TDS-OFDM data symbol.

5. A transmitter for time domain synchronous orthogonal frequency division multiplexing (TDS-OFDM), comprising:
    composing unit for preparing OFDM-body;
    PN generator for generating pseudo random (PN) sequence as a training signal;
    manipulating unit for manipulating said PN sequence to concentrate the energy distribution thereof to the same bandwidth of sub-carriers of said OFDM-body;
    frequency offsetting unit for offsetting the manipulated PN sequence to align with frequency spectrum of said sub-carriers; and
    padding unit for inserting the offset PN sequence as symbol prefix of a TDS-OFDM data symbol.

6. The transmitter for TDS-OFDM communication according to claim 5, wherein said manipulating unit repeats said PN sequence by N times, wherein the spectrum of the repeated PN sequence concentrates on discrete bundles of sub-carriers which are selected as one sub-carrier every N sub-carriers, where N is an integer greater than 1.

7. The transmitter for TDS-OFDM communication according to claim 5, wherein said manipulating unit expands said PN sequence by N times, wherein the spectrum of the expanded PN sequence concentrates on a block of continual adjacent sub-carriers, the bandwidth of the PN sequence is 1/N of the whole bandwidth, where N is an integer greater than 1.

8. The transmitter for TDS-OFDM communication according to claim 5, wherein said composing unit further comprises:
    a buffer unit for receiving a baseband data stream;
    a demultiplexer for demultiplexing said baseband data stream to a plurality of parallel data streams;
    an allocating unit for allocating each data stream of said parallel data streams to a respective sub-carrier frequency, wherein each parallel data stream is modulated with one of a plurality of orthogonal sub-carriers into a corresponding symbol stream; and
    a digital signal processing unit for performing inverse Fourier transform to transform the symbol streams into time domain representation of said symbol streams.

9. The transmitter for TDS-OFDM communication according to claim 5, wherein said padding unit further appends time domain representation of symbol streams into said TDS-OFDM data symbol.

10. The method of TDS-OFDM communication according to claim 1, wherein said manipulating step further comprises a repeating step that repeats said PN sequence by N times, wherein the spectrum of the repeated PN sequence concentrates on discrete bundles of sub-carriers which are selected as M adjacent sub-carriers every MN sub-carriers, where M is an integer determined by the time duration ratio of the OFDM body and prefix, and N is an integer greater than 1.

11. The transmitter for TDS-OFDM communication according to claim 5, wherein said manipulating unit repeats said PN sequence by N times, wherein said manipulating step further comprises a repeating step that repeats said PN sequence by N times, wherein the spectrum of the repeated PN sequence concentrates on discrete bundles of sub-carriers which are selected as M adjacent sub-carriers every MN sub-carriers, where M is an integer determined by the time duration ratio of the OFDM body and prefix, and N is an integer greater than 1.

\* \* \* \* \*